United States Patent
Guthrie (10) Patent No.: US 11,447,251 B2
(45) Date of Patent: Sep. 20, 2022

(54) CONVERTIBLE INTERIOR FIXTURE FOR A VEHICLE

(71) Applicant: Gulfstream Aerospace Corporation, Savannah, GA (US)

(72) Inventor: Joe Guthrie, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/949,120

(22) Filed: Oct. 14, 2020

(65) Prior Publication Data

US 2021/0114731 A1    Apr. 22, 2021

Related U.S. Application Data

(60) Provisional application No. 62/916,986, filed on Oct. 18, 2019.

(51) Int. Cl.
    *B64D 11/06*    (2006.01)
(52) U.S. Cl.
    CPC ...... *B64D 11/0605* (2014.12); *B64D 11/0643* (2014.12); *B64D 11/0647* (2014.12)
(58) Field of Classification Search
    CPC ............ B64D 11/0605; B64D 11/0643; B64D 11/0638; A47B 31/06; B60N 3/001; B61D 33/007; B61D 33/0021; B61D 33/0078
    See application file for complete search history.

(56) References Cited

U.S. PATENT DOCUMENTS

| 2005/0252429 | A1* | 11/2005 | Logan | B60N 3/001 108/147 |
| 2011/0203496 | A1* | 8/2011 | Garneau | B60N 2/0232 108/147 |
| 2016/0088951 | A1* | 3/2016 | McGuinness | A47C 31/08 5/35 |
| 2019/0083345 | A1* | 3/2019 | Romano | A61G 13/0018 |

FOREIGN PATENT DOCUMENTS

| GB | 2527615 A | * 12/2015 | ............. B60N 2/767 |
| WO | WO-2010131014 A1 | * 11/2010 | ............. B60N 2/143 |

* cited by examiner

*Primary Examiner* — Timothy D Collins
*Assistant Examiner* — Justin Michael Heston
(74) *Attorney, Agent, or Firm* — LKGlobal | Lorenz & Kopf, LLP (57) ABSTRACT

A configurable interior fixture for a vehicle includes a base assembly, a table assembly and an ottoman cushion. The base assembly is positionable between a lowered position and a raised position. The table assembly includes a center leaf section supported on the base assembly and a side leaf section that is moveable between a stowed position and a use position. The ottoman cushion includes a base frame with a cavity for receiving the table assembly and a cushion assembly attached to the base frame. The interior fixture may be configured as a foot rest by lowering the base assembly, folding the table assembly and attaching the ottoman cushion to the table assembly. The interior fixture may be configured as a table by raising the base assembly, detaching the ottoman cushion from the table assembly and the unfolding the table assembly into the use position.

20 Claims, 12 Drawing Sheets

CONVERTIBLE INTERIOR FIXTURE FOR A VEHICLE

CROSS-REFERENCE TO RELATED APPLICATIONS

This application claims the benefit of U.S. Provisional Application No. 62/916,986, filed on Oct. 18, 2019. The entire disclosure of the above application is incorporated herein by reference.

TECHNICAL FIELD

The present disclosure relates generally to an interior fixture in a vehicle, and more particularly relates to an interior fixture which provides an ottoman in a first configuration and a table in a second configuration.

BACKGROUND

This section provides background information related to the present disclosure which is not necessarily prior art.

Providing an adaptable interior configuration with various functions and features is of interest for many vehicle manufacturers. For example, in an aircraft, it is desirable to provide a configurable seating arrangement such that passenger may relax with their feet in an elevated position or provide a horizontal surface adjacent the seating arrangement for working or eating. However, space is limited and providing such functionality on board an aircraft consumes a significant amount of cabin space.

Accordingly, it is desirable to provide an interior fixture for a vehicle that is convertible from an ottoman to a table that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

The present disclosure is directed to a configurable interior fixture for a vehicle having a base assembly, a table assembly and an ottoman cushion. The base assembly is positionable between a lowered position and a raised position. The table assembly includes a center leaf section supported on the base assembly and a side leaf section that is moveable between a stowed position and a use position. The ottoman cushion includes a base frame with a cavity for receiving the table assembly and a cushion assembly attached to the base frame. The interior fixture may be configured as a foot rest by lowering the base assembly, folding the table assembly and attaching the ottoman cushion to the table assembly. The interior fixture may be configured as a table by raising the base assembly, detaching the ottoman cushion from the table assembly and the unfolding the table assembly into the use position.

BRIEF DESCRIPTION OF THE DRAWINGS

The various embodiments will hereinafter be described in conjunction with the following drawing figures, wherein like numerals denote like elements, and wherein.

Corresponding reference numerals indicate corresponding parts throughout the several views of the drawings.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Figure 1:
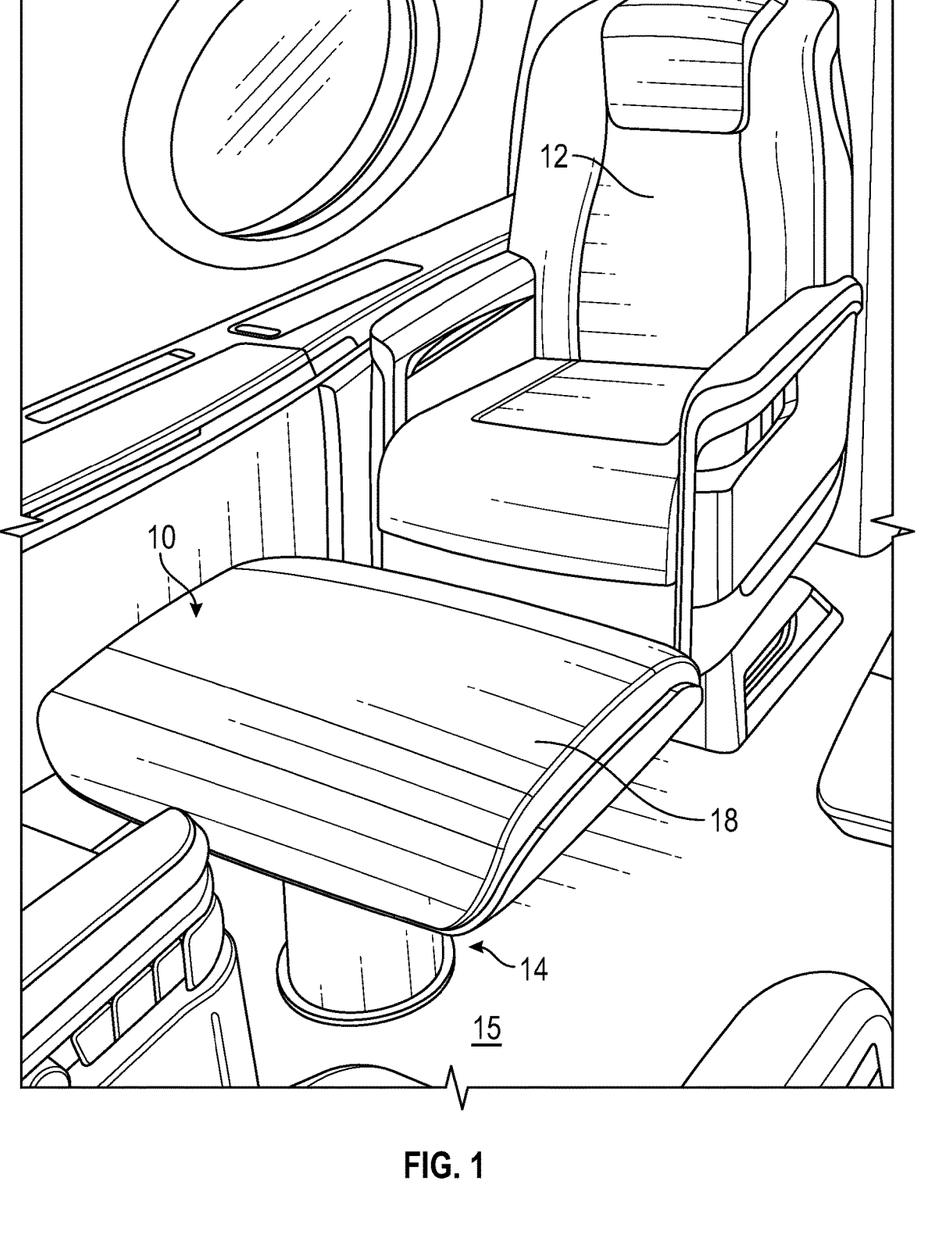
FIG. 1 is a perspective view of an interior area of an aircraft including a seating arrangement having an ottoman.
Figure 2:
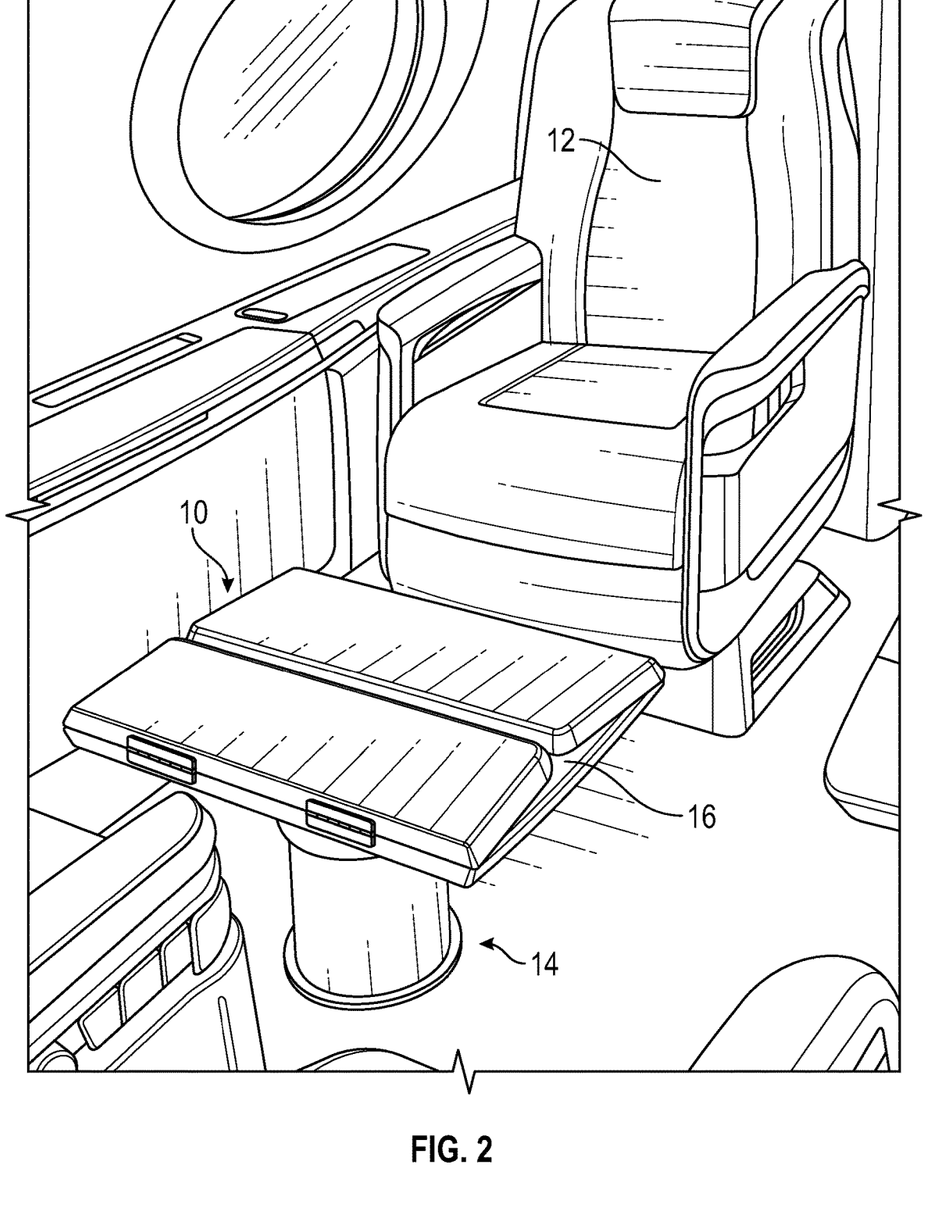
FIG. 2 is a perspective view similar to that shown in FIG. 1 with an ottoman cushion removed to expose a table assembly in a lowered, stowed position.
Figure 3:
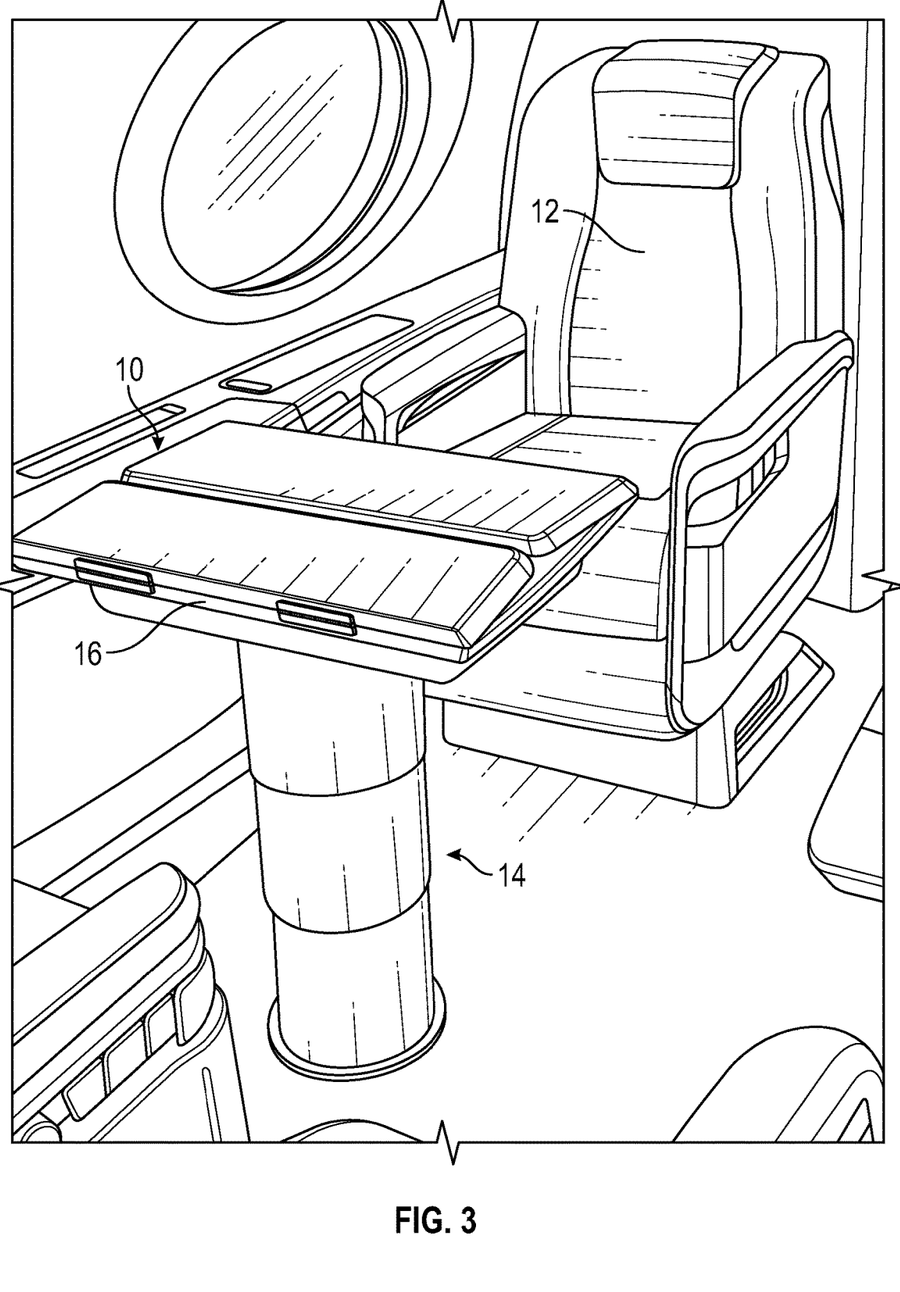
FIG. 3 is a perspective view similar to that shown in FIG. 2 with the table assembly in a raised, stowed position.
Figure 4:
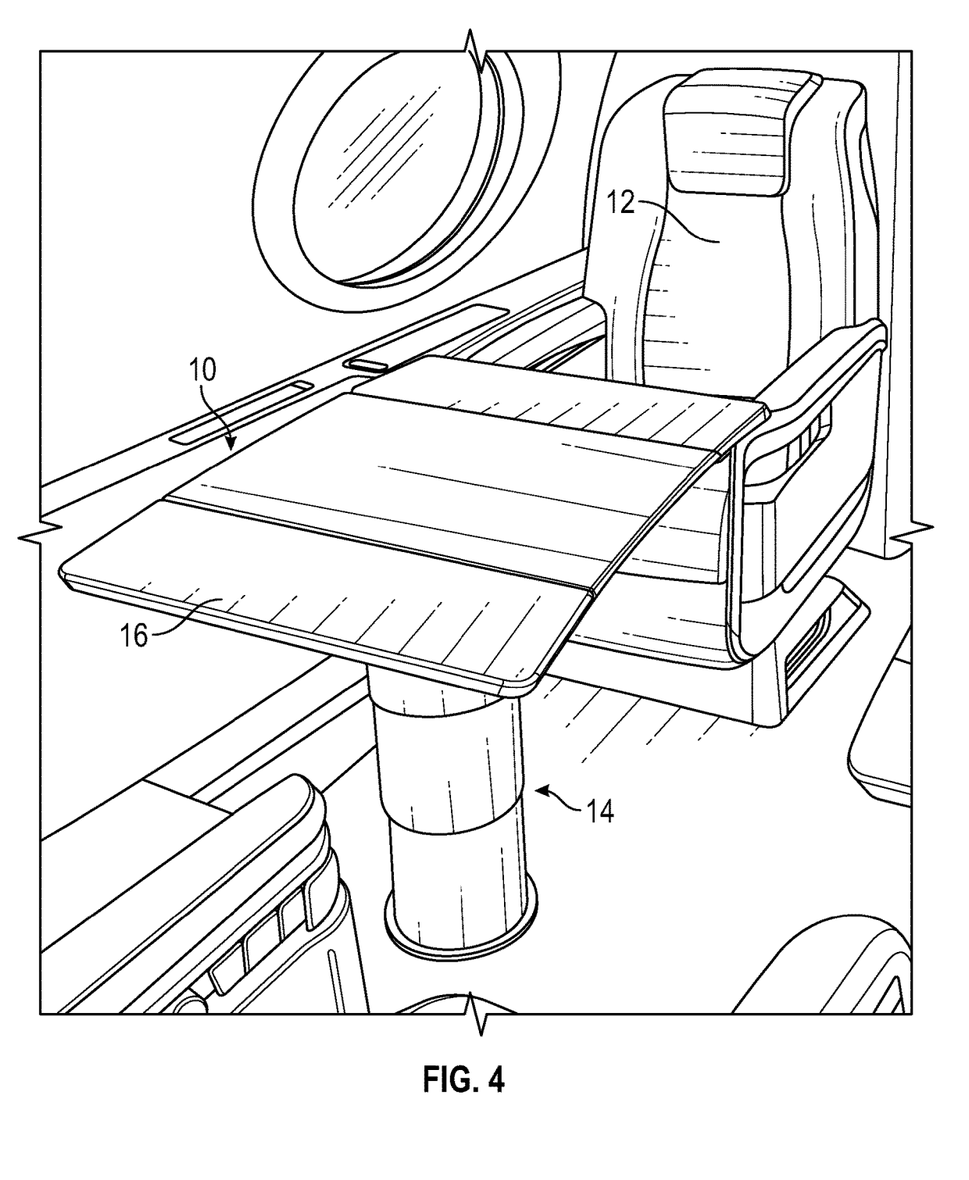
FIG. 4 is a perspective view similar to that shown in FIG. 4 with the table assembly in a raised, extended position.
Figure 5:
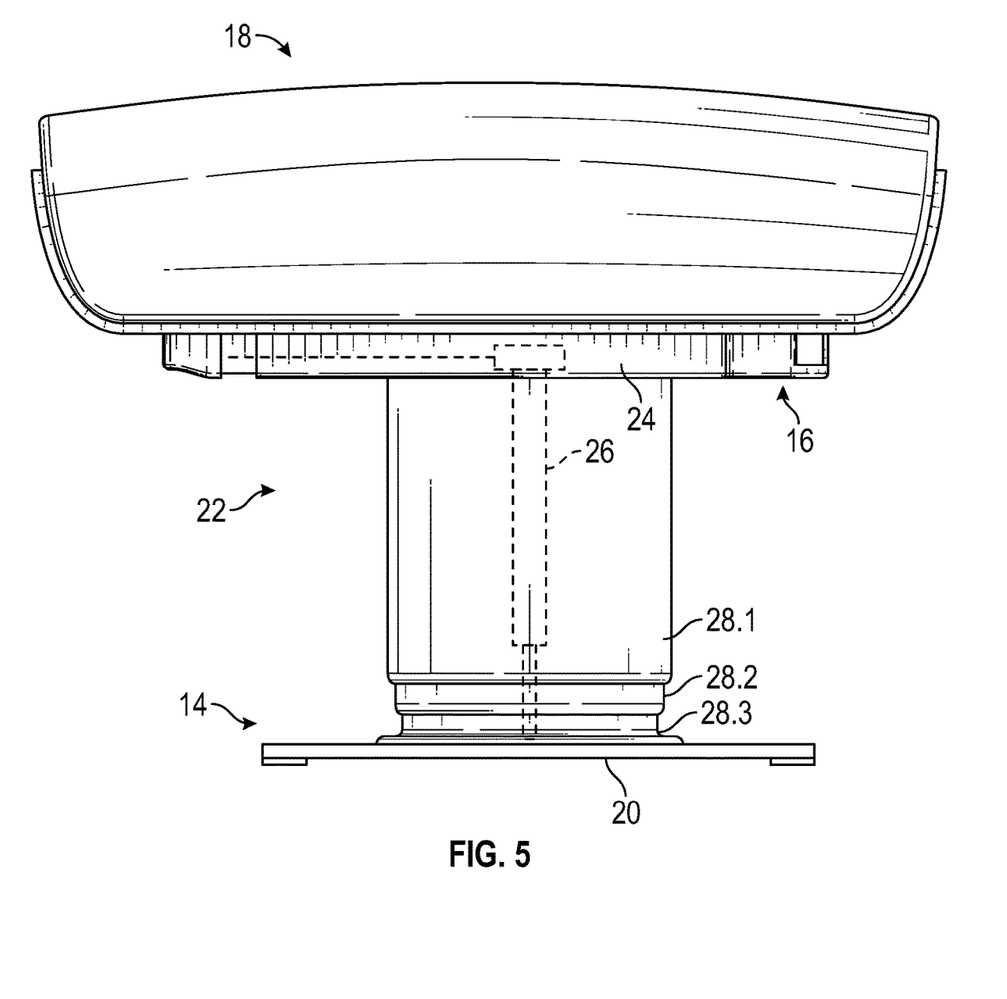
FIG. 5 is a front elevational view of the ottoman.
Figure 6:
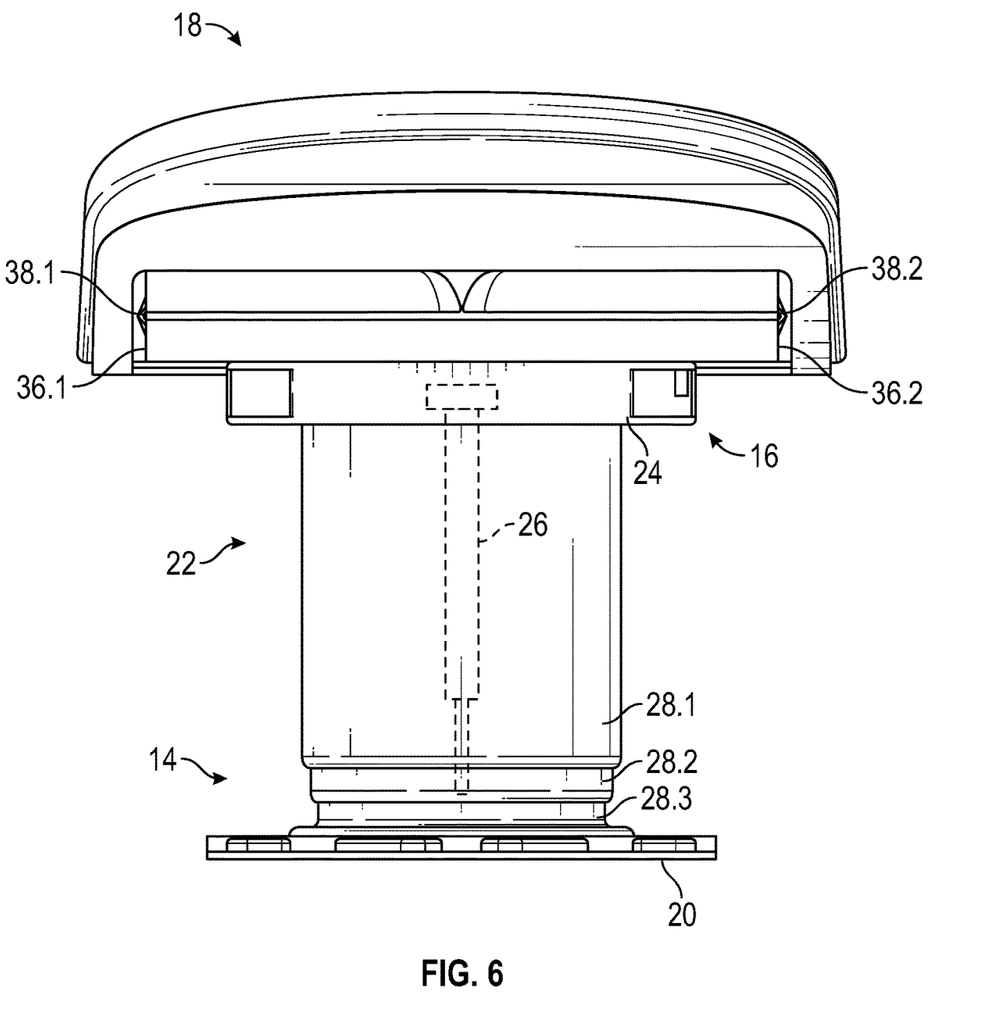
FIG. 6 is an end view of the ottoman.

With reference to FIGS. 1-4, the exemplary embodiment described herein provides an interior fixture 10 adjacent a seating arrangement 12 in a vehicle, such as, for example an aircraft. The interior fixture 10 includes a base assembly 14 that is positionable between a lowered position and a raised position relative to the floor 15 of the vehicle, a table assembly 16 supported on the base assembly 14 that is collapsible from a use position to a stowed position, and an ottoman cushion 18 that is removably attached to the table assembly. In the lowered position, the table assembly 16 may be in the stowed position and covered by the ottoman cushion 18 for providing an upholstered footrest adjacent the seating arrangement 12 as shown in FIG. 1. Alternately, in the lowered position the ottoman cushion 18 may be removed with the table assembly 16 in the stowed position to provide an occasional table as shown in FIG. 2. From this position, the base assembly 14 is positioned to the raised position as shown in FIG. 3 and the table assembly 16 is into the use position for providing a working surface adjacent the seating arrangement as shown in FIG. 4.

With reference now to FIGS. 5-8, the base assembly 14 includes a base plate 20 configured to attach the interior fixture 10 to the floor 15 of the vehicle. An adjustable length post 22 secured at a first end to the base plate 20 and extends upwardly therefrom. A platform 24 is secured at a second end of the post 22 opposite the base plate 20. The adjustable length post 22 includes a height adjustment mechanism 26 surrounded by a plurality of cylindrical members 28.1, 28.2, 28.3 that slide one within another in a telescopic manner for providing a telescoping cover 28. The telescoping cover 28 extends downwardly from the platform 16 over the height adjustment mechanism 26 and onto the base 20. Thus, the length of the telescoping cover 28 is capable of being extended and retracted in coordination with changing the length of the height adjustment mechanism 26. The height adjustment mechanism 26 may be an electrically driven mechanism, a pneumatically driven mechanism or hydraulically driven mechanism operable to position the interior fixture between the lowered position and the raised position. A control element 30 is operably coupled to the height adjustment mechanism 26 for actuating the height adjustment of the interior fixture 10. In one embodiment, the height adjustment mechanism 26 is a pneumatic gas strut and the control element 30 is a valve assembly operated by a handle disposed on the platform.

The table assembly 16 including a center leaf section 32 attached to a top surface of the platform 24. A first side leaf section 34.1 is attached to the center leaf section along a first transverse edge 36.1 by a first hinge member 38.1. A second side leaf section 34.2 is attached to the center leaf section 32 along a second transverse edge 36.2 by a second hinge member 38.2. The side leaf sections 36 may be rotated inwardly on top of the center leaf section 32 when the table assembly 16 is in a stowed position. The side leaf section 36 may be rotated outwardly so that they extend from the transverse edges 36 of the center leaf section 32 to form a generally planar work surface therewith. The hinges 38 are configured to adequate support to prevent sagging of the side leaf section 34 when they are deployed in the use position.

Figure 7:
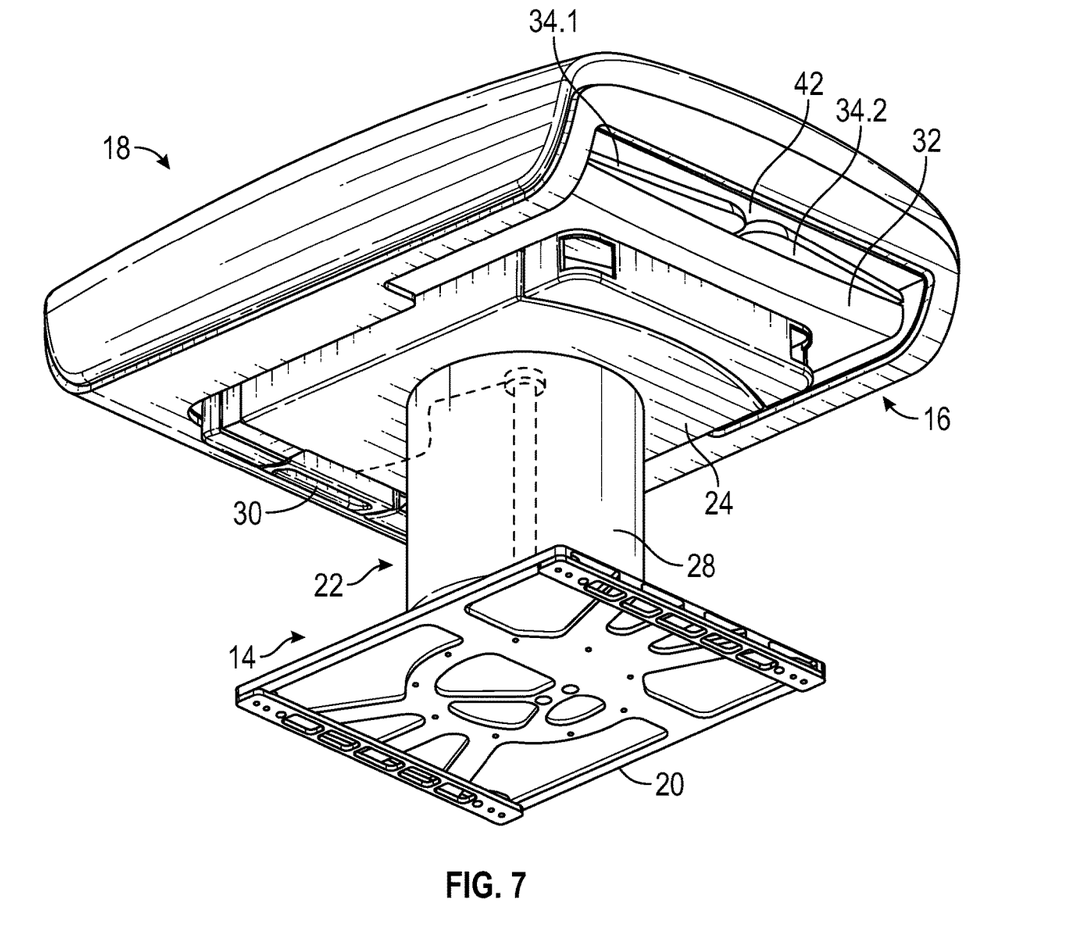
FIG. 7 is a lower perspective view of the ottoman showing the ottoman cushion in an installed state.
Figure 8:
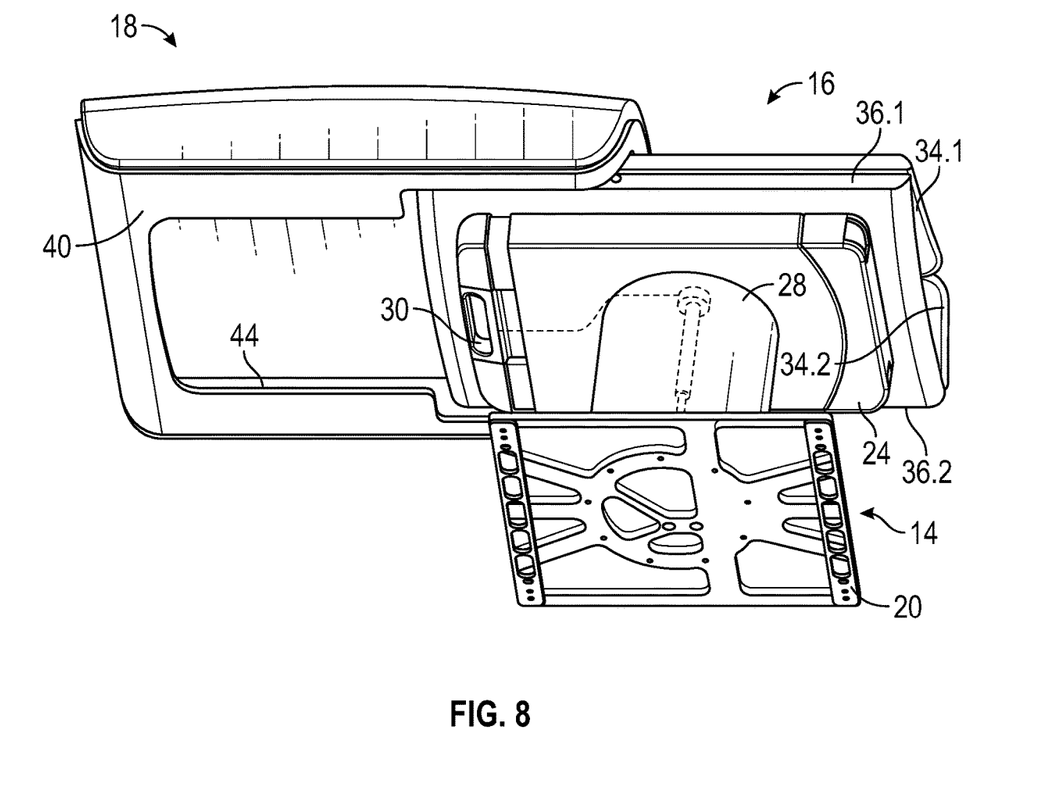
FIG. 8 is a lower perspective view similar to FIG. 7 showing the ottoman cushion being removed from a table base assembly.
Figure 9:
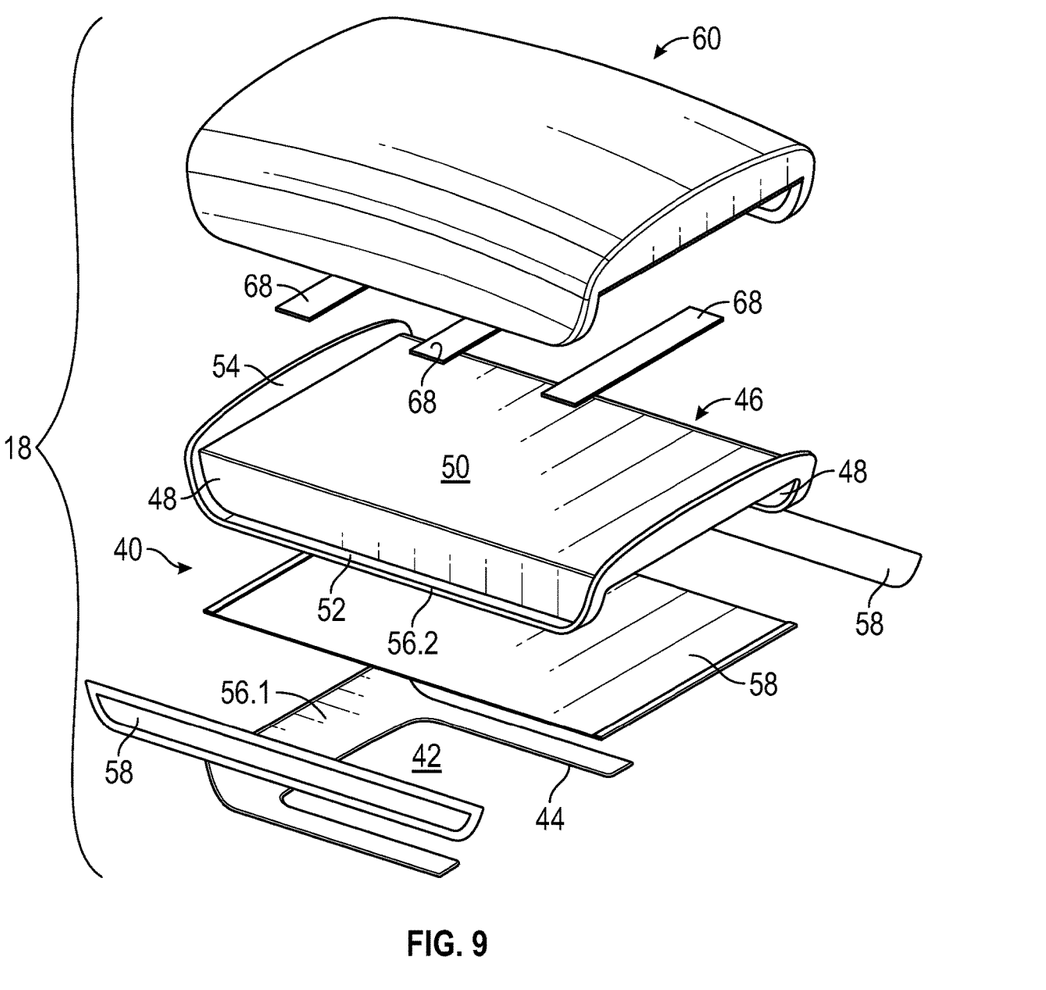
FIG. 9 is an expanded view showing the components of the ottoman cushion.
Figure 10:
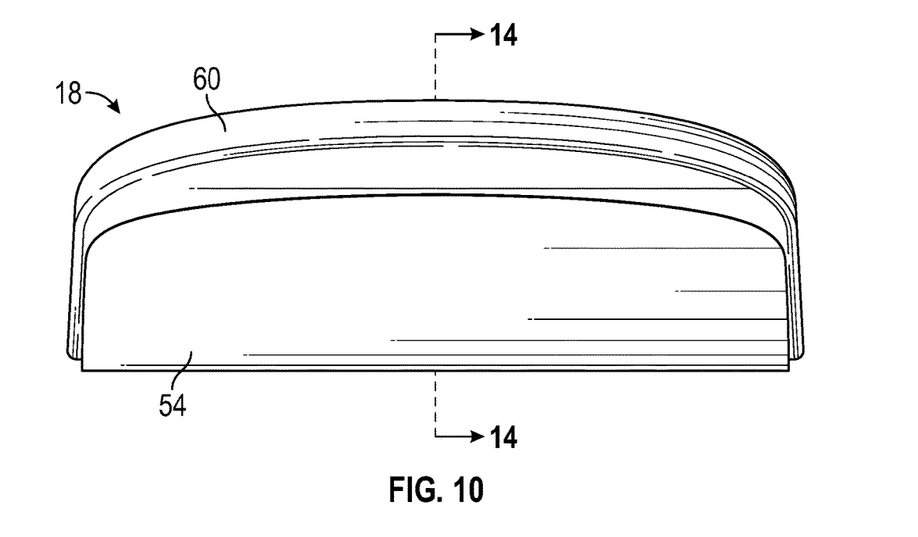
FIG. 10 is a right-end view of the ottoman cushion.
Figure 11:
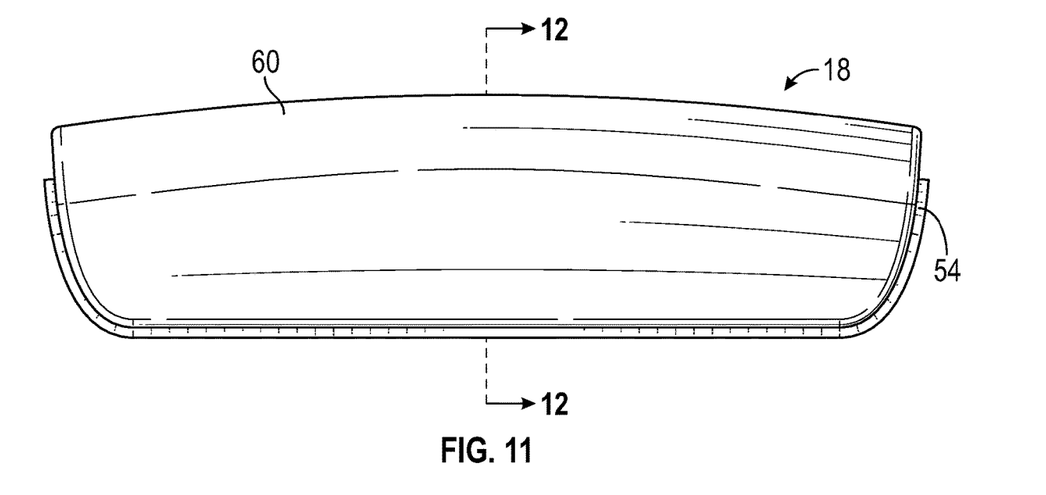
FIG. 11 is a front elevational view of the ottoman cushion.
Figure 12:
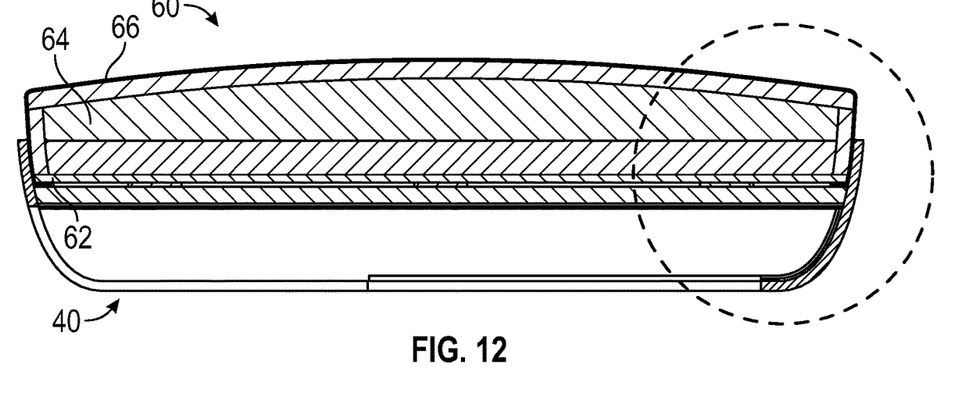
FIG. 12 is a cross section of the ottoman cushion taken through 12-12 in FIG. 10.
Figure 13:
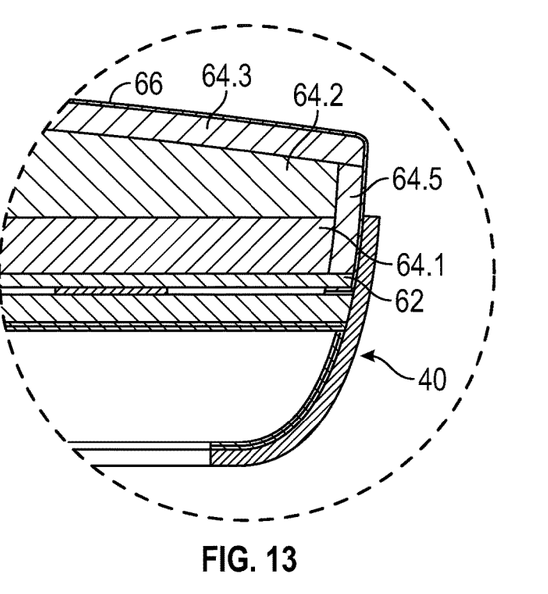
FIG. 13 is a detail within the broken line shown in FIG. 12.
Figure 14:
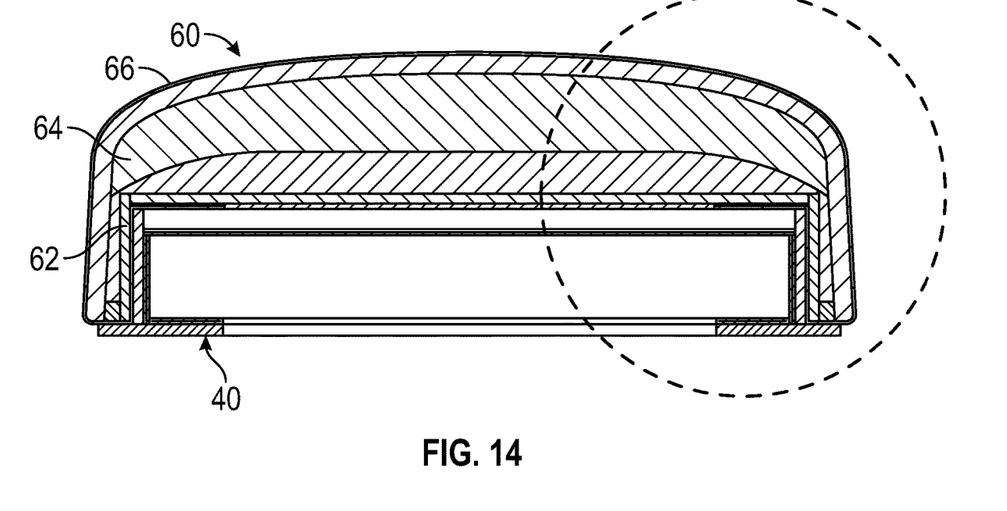
FIG. 14 is a cross section of the ottoman cushion taken through 14-14 in FIG. 11.
Figure 15:
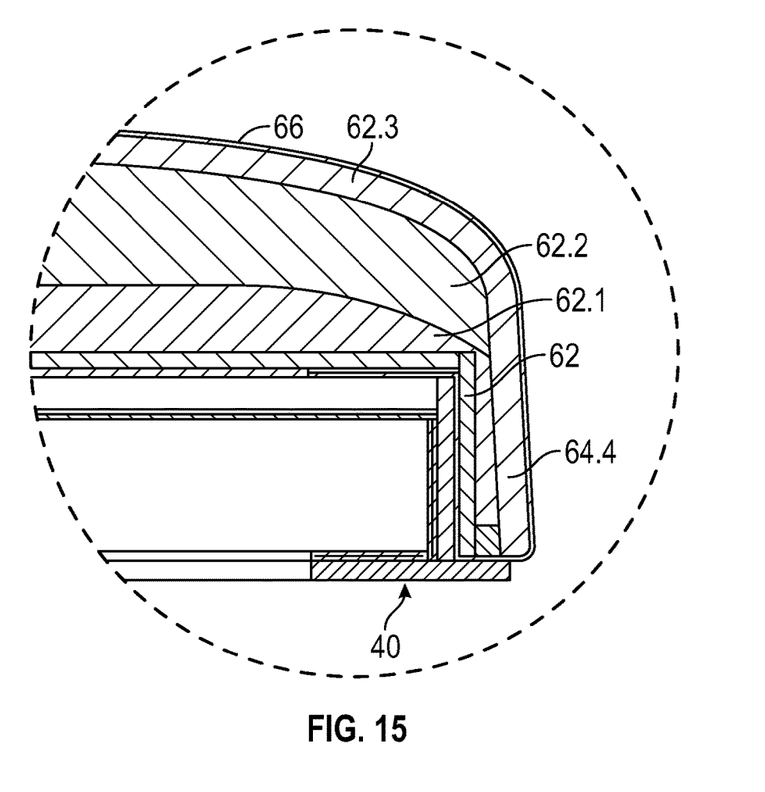
FIG. 15 is a detail within the broken line shown in FIG. 14.

As previously explained, the ottoman cushion 18 is configured to be detachably secured to the table assembly 16. In one embodiment, the ottoman cushion 18 is a loose equipment item that is slidably positioned over the table assembly 16 to conceal the table assembly 16 as shown in FIG. 7 and may be removed and stored elsewhere to reveal the table assembly 16 as shown in FIG. 8. The ottoman cushion 18 includes base frame 40 having an interior cavity 42 formed therein. The size and shape of the interior cavity 42 corresponds to the dimensions of the table assembly 16 such that the platform 24 extends downwardly through a cutout or slot 44 formed in the base frame 40. In an embodiment, the interior cavity 42 is sized to provide a press or friction fit such that the ottoman cushion 18 is removably attached to the table assembly 16. The slot 44 may be cutout to match the contour of the platform 24. As shown in FIGS. 7-8, the width of the slot 44 may vary such that the ottoman cushion 18 does not have to be slide off the entire length of the center leaf section 32.

With reference now to FIGS. 9-15, the base frame 40 includes a foundation 46 having a pair of side walls 48 extending from a top wall 50 that terminate at a lower edge 52 opposite the top wall 50. An outer show surface 54 extends from the lower edge 52 of the side walls 48 and curves upwardly around the ends of the foundation 46, A bottom face 56 is disposed on the lower edge 52 of the side walls 48 to partially enclose the interior cavity 42, which slidably receives the table assembly 16. The bottom face includes a panel 56.1 and a circumferential edge 56.2 extending generally perpendicular from the side walls 48. The interior surfaces of the cavity 42 formed by walls 48, 50 may be lined with a material layer 58 such as felt, suede-like fabric and/or polymeric material (e.g., thermoplastic acrylic-polyvinyl chloride) to protect the table assembly 16 while providing a degree of compliance and friction at the interface between the table assembly 16 and ottoman cushion 18.

The ottoman cushion 18 also includes a cushion assembly 60 releasably secured to the base frame 40. In an embodiment, hook and loop fastening strips 68 are interposed between the base frame 40 and the cushion assembly 60 to detachable secure these two components together. The cushion assembly 60 includes a substrate 62 supporting a foam pad 64. An outer wrap 66 extends around the foam pad 64 and adheres to the substrate 62. In one embodiment, the foam pad 64 is a multi-layered polyurethane cushion providing variable firmness and/or resilience over the cross-section of the cushion assembly 60. For example, the foam pad 64 as illustrated in FIGS. 12-15 may include a first foam layer 64.1, a second foam layer 64.2 and a third foam layer 64.3, each foam layer having different material properties to provide the variable firmness/resilience foam pad. The foam pad 64 may also include a longitudinal side wall 64.4 and a lateral side wall 64.5 that provides transverse support to the foam pad 64. The outer wrap 66 such as leather wraps the multi-layered foam pad to provide an upholstered appearance for the cushion assembly 60.

In the embodiment illustrated in FIGS. 12-15, the foam pad 64 may be fabricated using DAX Firehard Foam available from Skandia, Inc. of Davis Junction, Ill. The foam pad 64 may include a 1-inch thick first foam layer using DAX 47, a contoured thickness second foam layer using DAX 26, a ½-inch thick third foam layer using DAX 20, a ½-inch thick longitudinal side wall using DAX 55 and a tapered longitudinal lateral side wall using DAX 47 terminating with a ½-inch thick tip using DAX 55. The material properties for these layers are set forth in Table 1 below.

|  | DAX 20 | DAX 26 | DAX 47 | DAX 55 |
| --- | --- | --- | --- | --- |
| Density (pcf) | 3.2 ± 0.20 | 3.1 ± 0.30 | 3.2 ± 0.20 | 3.2 ± 0.20 |
| Test Method ASTM D3574 - 25% | 15-25 | 20-30 | 40-50 | 50-60 |
| Support Factor 65/25 | 2.4 min | 2.4 min | 2.4 min | 2.4 min |
| Test Method ASTM 1056 | 1.19-1.99 | 1.59-2.39 | 3.18-3.98 | 3.98-4.77 |
| Resilience (% Rebound) | 36-60 | 57-63 | 54-62 | 54-62 |

With reference again to FIGS. 1-4 and 7-8, a method for configuring the interior fixture will now be described starting from the lowered position shown in FIG. 1. In this position, the post 22 is fully retracted and the table assembly 16 is received in the cavity 42 of the base frame 40 so that the ottoman cushion 18 is positioned adjacent to the seating arrangement 12 and the interior fixture 10 provides a foot rest. To configure the interior fixture 10 into a table, the ottoman cushion 18 is slid laterally (to the right when viewed from the seating arrangement 12 as shown in FIG. 1) toward the aisle until the table assembly 16 reaches the wider section of the slot 44 formed in the bottom face 58 as best seen in FIG. 8. At this point, the ottoman cushion 18 may be lifted vertical off of the table assembly 16 and stowed in the aircraft cabin as loose equipment. In this configuration, the table assembly 16 provides an occasional table similar to a coffee table configuration for the seating arrangement 12 as shown in FIG. 2. To configure the interior fixture 10 as a dining table or standard height work surface, the control element 30 is manipulated for actuating the height adjustment mechanism 26 such that the post 22 telescopically extends to a raised position as shown in FIG. 3. Next, the side leaf section 34 are rotated outwardly until they are arranged in a generally planar position with the center leaf section 32. In this configuration, the table assembly 16 provides a dining table or elevated work surface in front of the seating arrangement 12.

While the interior fixture 10 is shown and described in the context of an aircraft ottoman with convertible table function, one skilled in the art should appreciate that applications and variations to the interior fixture are contemplated such that the detailed description is not intended to limit the scope, applicability, or configuration of the disclosure in any way. For example, the seating arrangement is shown as a single, forward-facing seat. However, the interior fixture may be readily to other seating arrangements including but not limited to multiple, forward-facing seats or a pair of seating arrangements including a forward-facing seat and a rearward-facing seat with the interior fixture 10 located therebetween. In this way, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A configurable interior fixture for a vehicle comprising:
    a base assembly including a post having a platform disposed on a first end thereof,
    a table assembly having a center leaf section supported on the platform and extending in a generally horizontal orientation; and
    an ottoman cushion having a cavity formed therein for receiving the table assembly;
    wherein the interior fixture is configured as an ottoman when the table assembly is in the stowed position and received in the cavity of the ottoman cushion to detachably secure the ottoman cushion to the base assembly; and
    wherein the interior fixture is configured as a table when the ottoman cushion is detached from the table assembly and the table assembly is in the use position.

2. The configurable interior fixture according to claim 1, the ottoman cushion comprising a base frame having a slot formed in a bottom wall thereof, wherein the platform is configured to be slidably inserted into the slot and the cavity is sized to provide a friction fit between the platform, the table and the ottoman.

3. The configurable interior fixture according to claim 2, the base frame further comprising a foundation having a pair of side walls extending from a flat interior surface and terminating at a lower edge opposite the interior surface, and a bottom face disposed on the lower edge, wherein the foundation defines the cavity for slidably receiving the platform.

4. The configurable interior fixture according to claim 3, the base frame further comprising an outer show surface extending from the bottom face and curving upwardly around the ends of the foundation, wherein a portion of the outer show surface extends generally perpendicular from the interior surface and the side walls to form a circumferential edge around the foundation.

5. The configurable interior fixture according to claim 1, the ottoman cushion further comprising a cushion assembly releasably secured to a base frame.

6. The configurable interior fixture according to claim 5, the cushion assembly further comprising a cushion having a substrate supported on the base frame, a foam pad supported on the substrate and an outer wrap extending around the foam pad and secured to the substrate.

7. The configurable interior fixture according to claim 6, the cushion comprising a multi-layered cushion including a first layer of foam material supported on the substrate, a second layer of foam material supported on the first layer and a third layer of foam material supported on the second layer, wherein each foam layer has a different material property for varying a firmness of the foam pad.

8. The configurable interior fixture according to claim 6, the multi-layered cushion further comprising a longitudinal side wall and a lateral side wall providing transverse support to the cushion.

9. The configurable interior fixture according to claim 1, the post comprising a height adjustment mechanism extending between a base plate and the platform and a telescoping cover extending over the height adjustment mechanism from the platform to the base, wherein the telescoping cover extends and retracts in coordination raising and lowering the height adjustment mechanism.

10. The configurable interior fixture according to claim 1, the table assembly further comprising at least one side leaf section operably coupled to the center leaf section, wherein the side leaf section is moveable between a stowed position on top of the center leaf section and a use position extending in a generally planar orientation from an edge of the center leaf section.

11. The configurable interior fixture according to claim 1, the table assembly further comprising a first leaf section operably coupled along a first edge of the center leaf section and a second leaf section operably coupled along a second edge of the center leaf section opposite the first edge, wherein the first and second side leaf sections are moveable between a stowed position on top of the center leaf section and a use position extending in a generally planar orientation from the first and second edges, respectively.

12. A configurable interior fixture for a vehicle comprising:
    a base assembly including a post having a platform disposed on a first end thereof, wherein the post includes a height adjustment mechanism extending between a base plate and the platform and a control element operably coupled to the height adjustment mechanism for positioning the interior fixture between a lowered position and a raised position;
    a table assembly having a center leaf section supported on the platform and extending in a generally horizontal orientation, a first leaf section operably coupled along a first edge of the center leaf section and a second leaf section operably coupled along a second edge of the center leaf section opposite the first edge, wherein the first and second side leaf sections are moveable between a stowed position on top of the center leaf section and a use position extending in a generally planar orientation from the first and second edges, respectively; and
    an ottoman cushion having a cavity formed therein for receiving the table assembly;
    wherein the interior fixture is configured as a foot rest when the table assembly is in the stowed position and received in the cavity of the ottoman cushion to detachably secure the ottoman cushion to the base assembly; and
    wherein the interior fixture is configured as a table when the ottoman cushion is detached from the table assembly and the table assembly is in the use position.

13. The configurable interior fixture according to claim 12, the base assembly further comprising a telescoping cover extending over the height adjustment mechanism from the platform to the base, wherein the telescoping cover extends and retracts in coordination raising and lowering the height adjustment mechanism.

14. The configurable interior fixture according to claim 12, the ottoman cushion comprising a base frame having a slot formed in a bottom wall thereof, wherein the platform is configured to be slidably inserted into the slot and the cavity is sized to provide a friction fit between the platform, the table and the ottoman cushion.

15. The configurable interior fixture according to claim 14, the base frame further comprising a foundation having a pair of side walls extending from a flat interior surface and terminating at a lower edge opposite the interior surface, and a bottom face disposed on the lower edge, wherein the foundation defines the cavity for slidably receiving the platform.

16. The configurable interior fixture according to claim 15, the base frame further comprising an outer show surface extending from the bottom face and curving upwardly around the ends of the foundation, wherein a portion of the outer show surface extends generally perpendicular from the interior surface and the side walls to form a circumferential edge around the foundation.

17. The configurable interior fixture according to claim 12, the ottoman cushion further comprising a cushion assembly releasably secured to a base frame.

18. The configurable interior fixture according to claim 17, the cushion assembly further comprising a cushion having a substrate supported on the base frame, a foam pad supported on the substrate and an outer wrap extending around the foam pad and secured to the substrate.

19. The configurable interior fixture according to claim 18, the cushion comprising a multi-layered cushion including a first layer of foam material supported on the substrate, a second layer of foam material supported on the first layer and a third layer of foam material supported on the second layer, wherein each foam layer has a different material property for varying a firmness of the foam pad.

20. The configurable interior fixture according to claim 19, the multi-layered cushion further comprising a longitudinal side wall and a lateral side wall providing transverse support to the cushion.

* * * * *